(12) United States Patent
Raghavendran et al.

(10) Patent No.: US 10,394,915 B1
(45) Date of Patent: Aug. 27, 2019

(54) ARCHITECTURE AND TECHNIQUES TO SEARCH LOGGING INFORMATION

(71) Applicant: Amazon Technologies, Inc., Seattle, WA (US)

(72) Inventors: Bharath Raghavendran, Bangalore (IN); Hemant Kumar Gupta, Bangalore (IN); Mohit Gupta, Bangalore (IN); Naman Chhabra, Hyderabad (IN)

(73) Assignee: Amazon Technologies, Inc., Seattle, WA (US)

( * ) Notice: Subject to any disclaimer, the term of this patent is extended or adjusted under 35 U.S.C. 154(b) by 402 days.

(21) Appl. No.: 15/246,078

(22) Filed: Aug. 24, 2016

(51) Int. Cl.
| | |
|---|---|
| *G06F 17/30* | (2006.01) |
| *G06F 16/9535* | (2019.01) |
| *G06F 16/182* | (2019.01) |
| *G06F 16/25* | (2019.01) |
| *G06F 16/2457* | (2019.01) |

(52) U.S. Cl.
CPC ........ *G06F 16/9535* (2019.01); *G06F 16/182* (2019.01); *G06F 16/24578* (2019.01); *G06F 16/252* (2019.01)

(58) Field of Classification Search
CPC .................................................. G06F 17/30867
See application file for complete search history.

(56) References Cited

U.S. PATENT DOCUMENTS

| | | | | |
|---|---|---|---|---|
| 7,024,431 | B1 * | 4/2006 | Kornelson | G06F 17/30563 |
| 2002/0188534 | A1 * | 12/2002 | Brady | G06Q 10/0639 |
| | | | | 705/32 |
| 2006/0085788 | A1 * | 4/2006 | Amir | G06F 8/30 |
| | | | | 718/100 |
| 2013/0317944 | A1 * | 11/2013 | Huang | G01S 5/0252 |
| | | | | 705/26.61 |

(Continued)

FOREIGN PATENT DOCUMENTS

WO    WO-2015141560 A1 *   9/2015 ............. G06F 21/55

*Primary Examiner* — Syed H Hasan (74) *Attorney, Agent, or Firm* — Eversheds Sutherland (US) LLP (57) ABSTRACT

Architectures and techniques to store and search logging information are provided. In some embodiments, statements included in the logging information can be categorized according to respective unique identifiers. A category of statements can be retained in one or more files within a directory associated with a unique identifiers representative of the category. The directory can be included in a distributed storage system. In addition, metadata including the unique identifier and a defined searchable field or another defined discrete amount of information pertaining to a statement associated with the unique identifier can provide an indexation of an available category of statements. In addition or in other embodiments, an interface unit can permit querying the logging information via programmatic queries or other queries received via a user interface. The query can include a desired search pattern and a response to the query can include a list of one or more unique identifiers indicative of respective statements matching the search (Continued)

pattern. Logging information statements sorted according a defined criterion can be provided in response to the selection.

20 Claims, 5 Drawing Sheets

(56) References Cited

U.S. PATENT DOCUMENTS

| | | | |
|---|---|---|---|
| 2015/0213066 A1* | 7/2015 | Yan | G06F 17/30294 |
| | | | 707/740 |
| 2015/0220605 A1* | 8/2015 | Syed | G06F 17/40 |
| | | | 707/776 |
| 2016/0246844 A1* | 8/2016 | Turner | G06F 17/2705 |
| 2017/0013003 A1* | 1/2017 | Samuni | G06F 11/00 |
| 2017/0103228 A1* | 4/2017 | Yavuz | G06F 21/606 |

* cited by examiner

ARCHITECTURE AND TECHNIQUES TO SEARCH LOGGING INFORMATION

BACKGROUND

Recording the activity of a software application during execution typically results in rich, vast amounts of logging information, particularly when the software application is executed in a massively parallel environment over a large cluster of host computers. The logging information can be retained in files across the cluster of host computers and/or in other files within an archival storage system. As such, access to specific portions of the logging information commonly entails searching for information across multiple host computers and/or multiple files within the archival systems. Conventional mechanisms for searching logging information can be tedious to implement and are usually time consuming, which in turn can hinder the troubleshooting, maintenance, and/or development of large, complex software applications. Much remains to be improved in the searching of logging information.

BRIEF DESCRIPTION OF THE DRAWINGS

The accompanying drawings are an integral part of the disclosure and are incorporated into the subject specification. The drawings present example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

DETAILED DESCRIPTION

The disclosure recognizes and addresses, in at least some embodiments, the issue of searching logging information and/or tracing information associated with massively parallel execution of a software application in a cluster of host computers. Accordingly, the disclosure provides embodiments of systems, devices, and techniques to retain and search logging information available from the execution of a software application or other types of rich information representative of activity during the operation of an apparatus including a computational system. Examples of such an apparatus can include industrial automation control systems, residential automation control systems, large experiment systems, or the like. In some embodiments, statements included in the logging information can be categorized according to respective unique identifiers. A category of statements can be retained in one or more files within a directory associated with a unique identifiers representative of the category. The directory can be included in a distributed storage system. It is noted that, in some embodiments, a directory need not be created, and one or more categories of statements can be retained in respective files. In addition or in other embodiments, the category of statements can be retained in some form of directory hierarchy created using at least in part the statement identifier associated with the category. Further, metadata including the unique identifier and a defined searchable field or another defined discrete amount of information pertaining to a statement associated with the unique identifier can provide an indexation of an available category of statements. In addition or in other embodiments, an interface unit can permit querying the logging information via programmatic queries or other queries received via a user interface. The query can include a desired search keyword, a search keyphrase, or a search pattern, and a response to the query can include a list of one or more unique identifiers indicative of respective statements matching the search pattern. In addition or in some embodiments, the response to the query can include other data structures, such as a portion of a logging information statement that satisfies the query (e.g., contains the search keyword, the search keyphrase, or the search pattern) or the logging statement in its entirety. Logging information statements can be provided in response to a selection of a specific unique identifier of the one or more unique identifiers. In some aspects, the logging information statements can be processed in numerous ways prior to, upon, or after responding to such a selection. In one example, logging information statements can be sorted according to a defined criterion in response to the selection. In addition or in another example, logging information statements can be decrypted in response to the selection.

Implementation or adoption of the architectures and/or techniques in accordance with at least some embodiments of this disclosure can improve computational efficiency of a computing system for logging and/or searching of logging information. More specifically, in one example, a software application that is executed in parallel across multiple host computers (e.g., tens of host computers) can result in multiple log files containing logging information, the files distributed across the multiple host computers. As such, a computing system that searches for logging information according to conventional or commonplace techniques is likely to analyze each of the multiple log files, which can result in inspection of a large amount of information, e.g., a few MBs to a few GBs of data. To compound the computational complexity, each of the multiple log files can include logging statements pertaining to different computing requests. Yet, at least some of the embodiments of the present disclosure can reduce the computational complexity of the search for specific logging information statements by first categorizing and centralizing the storage of the logging information available in the multiple log files, and then searching for defined key-value pairs than serve to index the logging information statements. As such, rather than searching for a regular expression across the multiple log files, which can take between about 10 minutes to about 15 minutes per file (considering a 4 MB to 5 MB file, for example) per host, the search for a key-value pair and the access to an associated logging information statement can be accomplished in few seconds. Further, a search of logging information according to conventional techniques also incurs the computational overhead of performing a login to each of the hosts that retain at least some of the multiple log files. Therefore, searching for logging information according to aspects of the present disclosure can result in a speedup of at least about 100 times. In some implementations, searching logging information according to aspects of the present disclosure can reduce search complexity from O(n) to O(1), where n is a natural number indicative of the number of logging information statements included in a log file generated by an application executed by host computers.

Further, as the execution of an application progresses, commonplace computing systems typically send (e.g., push) a log file retained in a host computer to an archival system. The size of the files to be analyzed when searching for specific logging information increases with time, resulting in time-intensive searches for regular expressions, e.g., a grep search of a file having a size of a few GBs can be accomplished in about one hour. Yet, at least some embodiments of the present disclosure can permit search for a desired logging information statement in a matter of about a few seconds. Further, it is noted that in scenarios in which log files are pushed hourly (or at a similar rate) to the archival system, when the time frame of an occurrence of a log entry is unknown, inspection of each one-hour period may be needed, further deteriorating the computational performance of conventional systems. Embodiments of the present disclosure are immune to such performance deteriorating scenarios.

Figure 1:
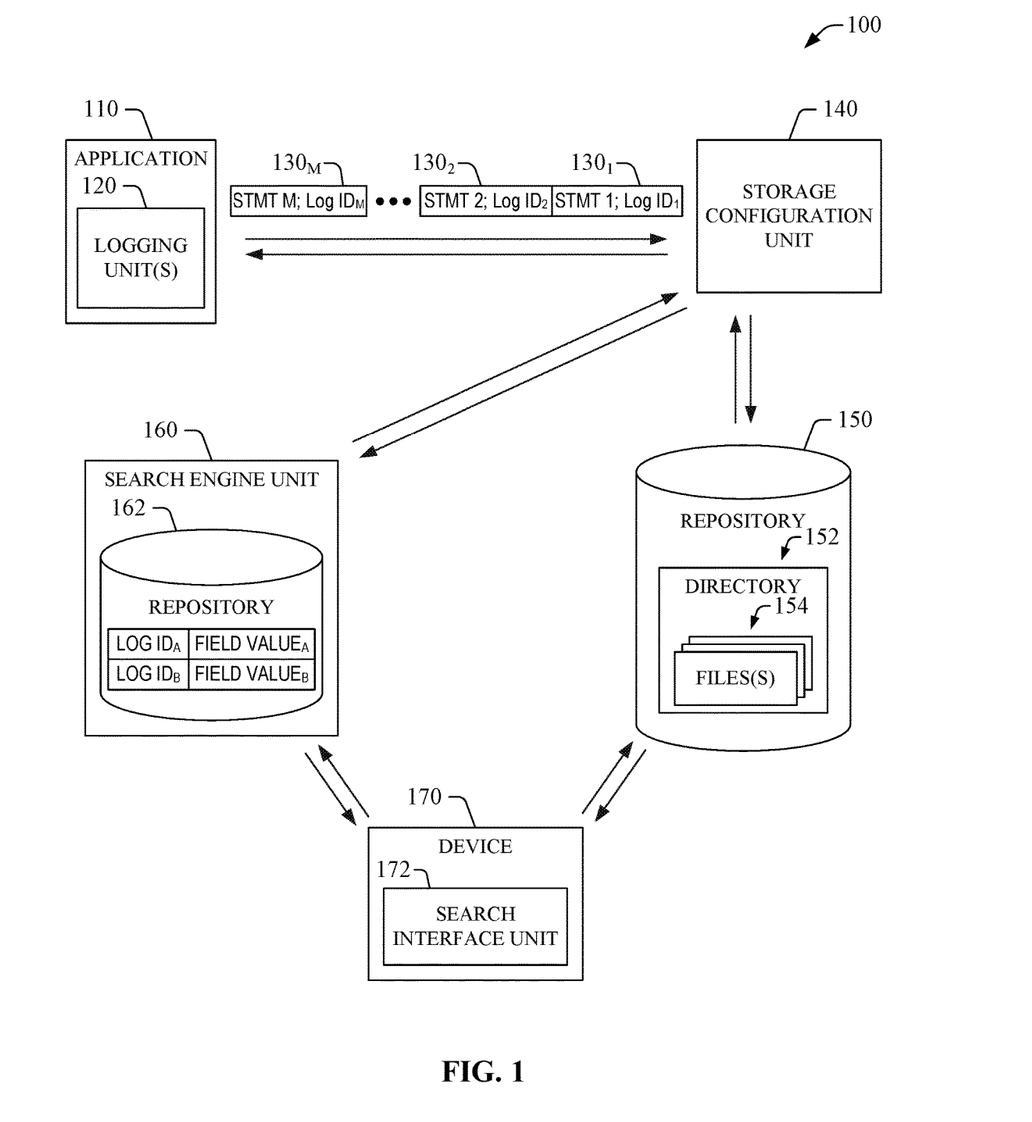
FIG. 1 presents an example of an operational environment to configure storage of logging information and to search for elements of the logging information in accordance with one or more aspects of the disclosure.

Referring to the drawings, FIG. 1 illustrates an example of a computing environment 100 that can permit searching of logging information in accordance with one or more embodiments of the disclosure. The computing environment 100 can include a software application 110 that, in execution by one or more host computers, can provide a service. In some implementations, the software application 110 and the execution thereof can be provided as software-as-a-service, in which the software application 110 can be executed by multiple host computers in a distributed configuration, such as a massively parallel execution configuration. The service can be embodied in or can include hosting of a website, a ticketing service, a billing service, or the like. Such a website can be embodied in or can include, for example, a merchant website, a non-profit organization website, a for-profit organization, a government entity website, or the like.

As illustrated, the software application 110 can include a one or more logging units 120 that can generate logging information statements, such as log statements, tracing statements, a combination thereof, or the like. In some embodiments, at least one logging unit (or, in some embodiments, each logging unit) of the logging unit(s) 120 can be embodied in or can constitute a respective host computer that executes at least a portion of the software application 110, where the at least one logging unit can generate at least a portion of the logging information statements. In some embodiments, the logging unit(s) 120 (collectively or individually) can generate encrypted logging information statements. To that end, in some aspects, the logging unit(s) 120 can generate a logging information statement and can subsequently or nearly concurrently encrypt the logging information statement according to a desired type and/or level of encryption complexity. The logging unit(s) 120 also can generate a statement identifier that uniquely identifies a logging information statement. To that end, in some embodiments, at least one (or, in some embodiments, each) of the logging unit(s) 120 can include a component (e.g., an appender component) that can generate the statement identifier. The statement identifier can be embodied in or can include, for example, a unique numeric code, a unique alphanumeric code, a unique alphabetic code, a unique code including special characters, or a combination thereof. A code of such codes can include a unique string of characters (e.g., numeric characters, alphabetic characters, special characters, or a combination thereof). The logging information statement and the associated statement identifier can be generated during execution of the software application 110. As mentioned, a host computer can execute at least a portion of the software application 110. In one implementation, in a computing session in which the software application 110 is executed, the logging unit(s) 120 can generate logging information statements, each identified by a statement identifier. The statement identifier uniquely identifies a computing session or a computing request within the session that generates a logging information statement. In addition or in other implementations, during the computing session, the logging unit(s) 120 can generate a first group of logging information statements, each uniquely identified by a first statement identifier, and also can generate a second group of logging information statements, each uniquely identified by a second statement identifier. The first statement identifier and the second statement identifier can correspond, respectively, to a first computing request (e.g., read/write request) and a second computing request (e.g., access a database) within the computing session.

In some scenarios, the logging unit(s) 120 can generate logging information statements, e.g., statement 1 associated with data structure $130_1$, statement 2 associated with data structure $130_2$, ... statement M-1 associated with data structure $130_{M-1}$, and statement M associated with data structure $130_M$, with M a natural number, and respective statement identifiers, e.g., log identifier (Log ID) 1, Log ID 2, ... Log ID M-1, and Log ID M. In one aspect, the logging unit(s) 120 can incorporate into a data structure J $130_J$ associated with a statement J, with J=1, 2, ..., M-1, and M, the respective Log $ID_J$, and can send a stream of data structures $130_1$-$130_M$, where a data structure $130_J$ includes the statement J and the Log ID J, as shown in FIG. 1. It is noted that each of the statement identifiers {Log $ID_J$} (J=1, 2, ..., M-1, and M) need not be distinct, and two or more of the statement identifiers Log $ID_J$ can be the same, thus identifying a common computing session (or, in some embodiments, a common computing request). Put more succinctly, statement identifiers and statements can have a many-to-one relationship, where two or more statements can have a common statement identifier. The logging unit(s) 120 can send the stream of data structures $130_1$-$130_M$ over a communication network to a storage configuration unit 140. In one implementation, the logging unit(s) 120 can send the stream of data structures as a series of messages as the logging information statements are generated or otherwise occur. In addition or in another implementation, the logging unit(s) 120 can send the stream of data structures in batches of messages, where a batch can be sent during a defined period beginning at a defined time, and can include including a defined number of messages. Sending the stream of data structures in batches can reduce the number of input/output operations at a host computer (not depicted in FIG. 1) that, in some embodiments, executes at least a portion of the software application 110 and/or the storage configuration unit 140. Relying on batches of logging information statements also can reduce traffic in the communication network. For the sake of clarity, the communication network is generically represented with two arrows, and includes wired link(s) and/or wireless link(s) and several network components (such as routers or switches, concentrators, server devices, and the like) that can form a personal area network (PAN), a local area network (LAN), a metropolitan area network (MAN), a wide area network (WAN), and/or other networks (wireless or wired) having similar or different footprints. The communication network permits the transmission, reception, and/or exchange of information between the logging unit(s) 120 and the storage configuration unit 140. Other communication networks that permit the transmission reception, and/or exchange of information between components or other types of functional elements are represented similarly and can include similar functional elements.

The storage configuration unit 140 can receive at least a portion of the stream of data structures, and associated logging information statements (e.g., a log statement) and respective unique identifiers (e.g., a log identifier). The storage configuration unit 140 can process (e.g., operate upon) the received data structures and, based at least on the processing, the storage configuration unit 140 can identify or otherwise can determine a unique identifier for a subset of the logging information statements. For instance, as part of the processing, the storage configuration unit 140 can parse the received data structures and can determine that Log $ID_K$, with K a natural number satisfying $1<K \leq M$, corresponds to {statement N, statement N+1, . . . , statement N+P−1, statement N+P}, where N and P are natural numbers satisfying $1<N+P<M$. It is noted that the statements having the statement identifier Log $ID_K$ need not be consecutive, and any configuration of the {statements J}, with J=1, 2 . . . M−1, M, can include statements each identified by Log $ID_K$. For example, each statement of the set of statements {statement $P_1$, statement $P_2$, . . . , statement Q−1, statement Q}, where Q is a natural number satisfying $1<Q \leq M$, can be identified by Log $ID_K$.

Figure 2:
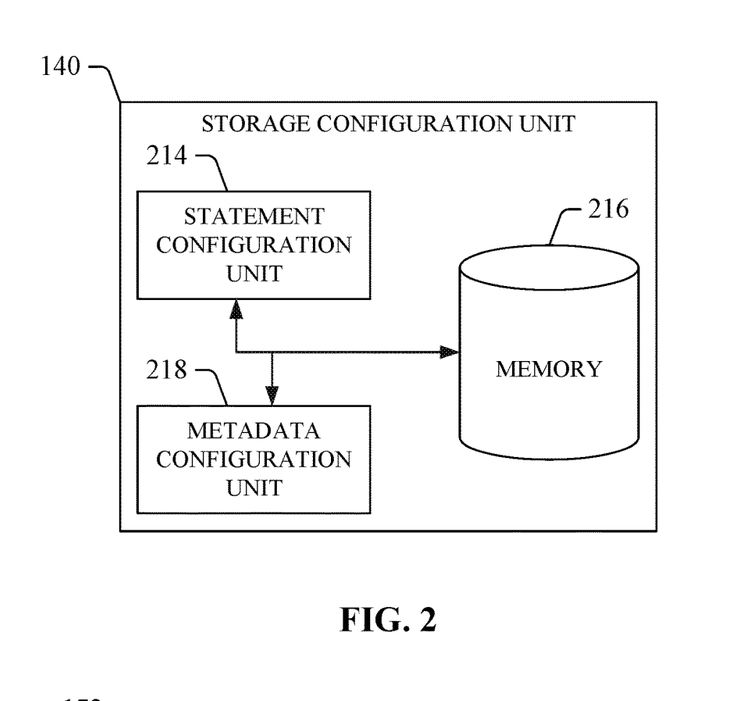
FIG. 2 presents an example of a storage configuration unit in accordance with one or more embodiments of the disclosure.

In some aspects, a unique identifier that is determined to correspond to logging information statements can be utilized to configure the storage of such statements The configuration of the logging information statements in accordance with aspects described herein can permit efficient search and/or retrieval of such statements. Specifically, in one example, the storage configuration unit 140 can create a directory 152 in one or more memory devices 150 (referred to as repository 150), where the directory is named after the unique identifier. The directory can pertain, in some implementations, to a directory hierarchy created or otherwise generated using, at least in part, the unique identifier. For instance, in a scenario in which the unique identifier is "1234," the directory hierarchy can correspond to the path 1/2/3/4 on disk storage. In other examples, instead of creating the directory 152, a single file can be created for the unique identifier, in the repository 150. The repository 150 can be embodied in or can include, for instance, a distributed storage system (not depicted) including memory storage devices. The memory storage devices can be configured in a distributed architecture and can be accessed as a service. Thus, in one aspect, such devices may be referred to as storage service devices. In addition or in other aspects, the storage configuration unit 140 can create one or more files 154 within the directory 152, where a file of the file(s) 154 can include the logging information statements. In some embodiments, such as the embodiment shown in FIG. 2, the storage configuration unit 140 can include a statement configuration unit 214 that directs or otherwise causes the repository 150 to store logging information statements in accordance with aspects described herein. In the illustrated embodiment, the storage configuration unit 140 includes one or more memory devices 216 (collectively referred to as memory 216) that can retain information associated with the described functionality of the storage configuration unit 140.

The storage configuration unit 140 also can process the logging information statements associated with the unique identifier that is determined to be common to such statements. Therefore, in one aspect, the storage configuration unit 140 can determine, using the logging information statements, that a searchable field is present in a logging information statement of the logging information statements. To that end, in some embodiments, the storage configuration unit 140 can search for a regular expression in the logging information statement, where the regular expression can include a defined sequence of characters. The defined sequence of characters comprises natural language representative of at least one of a user account identifier, a product type, a product name, a timestamp, or the like. In some implementations, the searching for the regular expression can include applying a grep command to the log file, the grep command including the sequence of characters as a search pattern. In a scenario in which such a search yields the defined sequence of characters, the storage configuration unit 140 can determine that the regular expression is present in the logging information statement, and can assign the defined sequence of characters to the searchable field. In addition or in another aspect, the storage configuration unit 140 can generate a value corresponding to the searchable field. Further or in yet another aspect, the storage configuration unit 140 can utilize or otherwise leverage the unique identifier and such a value to generate metadata associated with the logging information statements. Specifically, in some implementations, the metadata can be embodied in or can include a key-value pair including the value and having the unique identifier as the key. The storage configuration unit 140 can retain the metadata in a search engine unit 160. To that end, in one example, the storage configuration unit 140 can create the metadata in a memory element 164 of one or more memory storage devices 162 (referred to as repository 162). In some embodiments, such as the embodiment shown in FIG. 2, the storage configuration unit 140 can include a metadata configuration unit 218 that direct or otherwise cause the search engine unit 160 to generate the metadata in accordance with aspects described herein. The metadata configuration unit 218 also can direct or otherwise cause the search engine unit 160 to store the metadata comprising the key-value pairs described herein.

With further reference to FIG. 1, by receiving and processing logging information statements in accordance with aspects described herein, the storage configuration unit 140 can categorize the statements according to unique identifiers. In addition, the creation of metadata including a unique identifier of a logging information statement and a defined searchable field or another defined discrete amount of information (e.g., a finite string of characters) pertaining to the logging information statement can provide an indexation of the categorized logging information statements. Therefore, in some aspects, the computing environment 100 can simplify access to desired logging information when compared to conventional or otherwise commonplace architectures to search logging information. More specifically, the computing environment 100 can include a device 170 that can operate as a client device of a sub-system of the computing environment 100 including the search engine unit 160 and the repository 150, for example. As illustrated, the device 170 can include a search interface unit 172 that can permit accessing logging information. To that end, the search interface unit 172 can receive input information representative or otherwise indicative of a search query (e.g., a keyword, a keyphrase, a defined search pattern, or the like) for desired logging information. In some implementations, the device 170 can display or otherwise present a user interface including selectable indicia, such as a command-line interface and/or a graphical user interface, that can permit receiving at least a portion of the input information. As such, the search interface unit 172 can receive at least the portion of the input information via one or more selectable indicia presented in a user interface. In addition or in other implementations, the search interface unit 170 can be embodied in or can include an application programming interface (API) interface that can be accessed from a script or another type of software module in execution in the device 170 or another device functionally coupled thereto. Thus, in some aspects, the search interface unit 172 can receive at least another portion of the input information programmatically via the API. In one example, the API can be embodied in a RESTful API. In some embodiments, such as the example embodiment illustrated in FIG. 3, the input interface 314 can receive the input information indicative of a search query in accordance with aspects of the present disclosure.

Regardless of the particular manner in which the input information representative or otherwise indicative of a search query is received at the search interface unit 172, the device 170 can send the search query over a communication network (e.g., a wireless network, wireline network, or a combination thereof) or a communication channel thereof to the search engine unit 160. The search engine unit 160 can receive the search query, over the communication network, for example, and can generate, using at least the search query, one or more unique identifiers associated with respective logging information statements. In one aspect, each (or, in some embodiments, at least one) of the unique identifiers can be paired with a value that satisfies the search query. The search engine unit 160 can send a list of the unique identifiers to the device 170. In one example, the list or any other type of data structure including information indicative of the unique identifiers can be sent over the communication network or the communication channel thereof.

Therefore, the device 170 can receive at least one unique identifier respectively paired with a searchable field that satisfies a search query in accordance with aspects described herein. Thus, in one aspect, the search interface unit 172 can receive input information representative or otherwise indicative of a selection of a unique identifier of the at least one unique identifier. In response to the selection (e.g., upon or after receipt of the selection), the search interface unit 172 can access or otherwise obtain at least a portion of the group of logging information statements. To that end, in some implementations, the search interface unit 172 can download one or more logging information statements from the repository 150. Specifically, in some implementations, the search interface unit 172 can generate a request for at least one of the logging information statement(s), where the request includes, for example, the unique identifier selected via the input information. The search interface unit 172 can send such a request to the repository 150. In particular, for example, the device 170 can send the request to the repository 150 over another communication network different from the communication network that permits exchange of information between the device 170 and the search engine unit 160. The repository 150 or a component thereof can receive the request and, in response, the repository 150 can send at least a subset of the logging information statement(s) to the device 170. Thus, in one aspect, the search interface unit 172 can receive at least the subset of the logging information statement(s).

The search interface unit 172 (or, in some embodiments, a component thereof or coupled thereto) can process a group of logging information statements received from the repository 150 in order to provide a desired data view of the group. In one aspect of such processing, the search interface unit 172 can order or otherwise sort the group of logging information statements chronologically and/or in accordance with one or more ordering criteria. In another aspect of such processing, the search interface unit 172 can decrypt at least a portion of the group of logging information statements. Such decryption can permit accessing information that was or is retained as encrypted information in the repository 150. As mentioned, such information can include encrypted logging information statements that the storage configuration unit 140 received from at least one of the logging unit(s) 120. In some aspects, the device 170 can display or otherwise present the desired view of the group of logging information statements at a display device and/or another input/output (I/O) interface device of the device 170. In some embodiments, such as the example embodiment illustrated in FIG. 3, the utility unit 318 can order or otherwise sort the group of logging information statements in accordance with aspects of the present disclosure. In addition or in other embodiments, the utility unit 318 also can decrypt at least a portion of the group of logging information statements. The one or more memory devices 316 (collectively referred to as memory 316) can retain the one or more ordering criteria. In addition or in the alternative, the memory 316 other information associated with the described functionality of the search interface unit 172.

Figure 3:
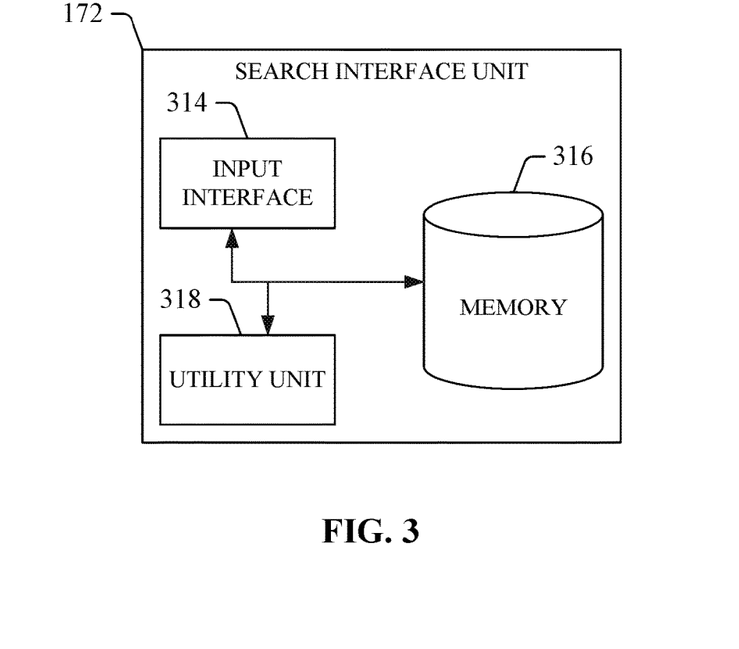
FIG. 3 presents an example of a search interface unit in accordance with one or more embodiments of the disclosure.

Depending on computation complexity and/or computing resources available to the search interface unit 172, a component of the repository 150 or functionally coupled thereto can process a group of logging information statements in numerous ways. In some embodiments, such a component can be embodied in or can include, for example, the utility unit 318. Therefore, in such embodiments, the utility unit 318 can be configured (e.g., installed, linked, and/or compiled) within the repository 150 or to be functionally coupled thereto. In some of the processing aspects, the component can order a group of logging information statements according to a defined ordering criterion prior to sending at least a portion of the ordered group to the search interface unit 172. In addition, the device 170 can display or otherwise present the portion of the ordered group at a display device and/or another I/O interface device of the device 170. In some other processing aspects, such a component of the repository 150 can decrypt the group of logging information statements, and can send at least a portion of the decrypted logging information statement(s) of the group to the device 170. Thus, the device 170 can display or otherwise present the portion of the decrypted logging information statement(s) at a display device and/or another I/O interface device of the device 170.

Figure 4:
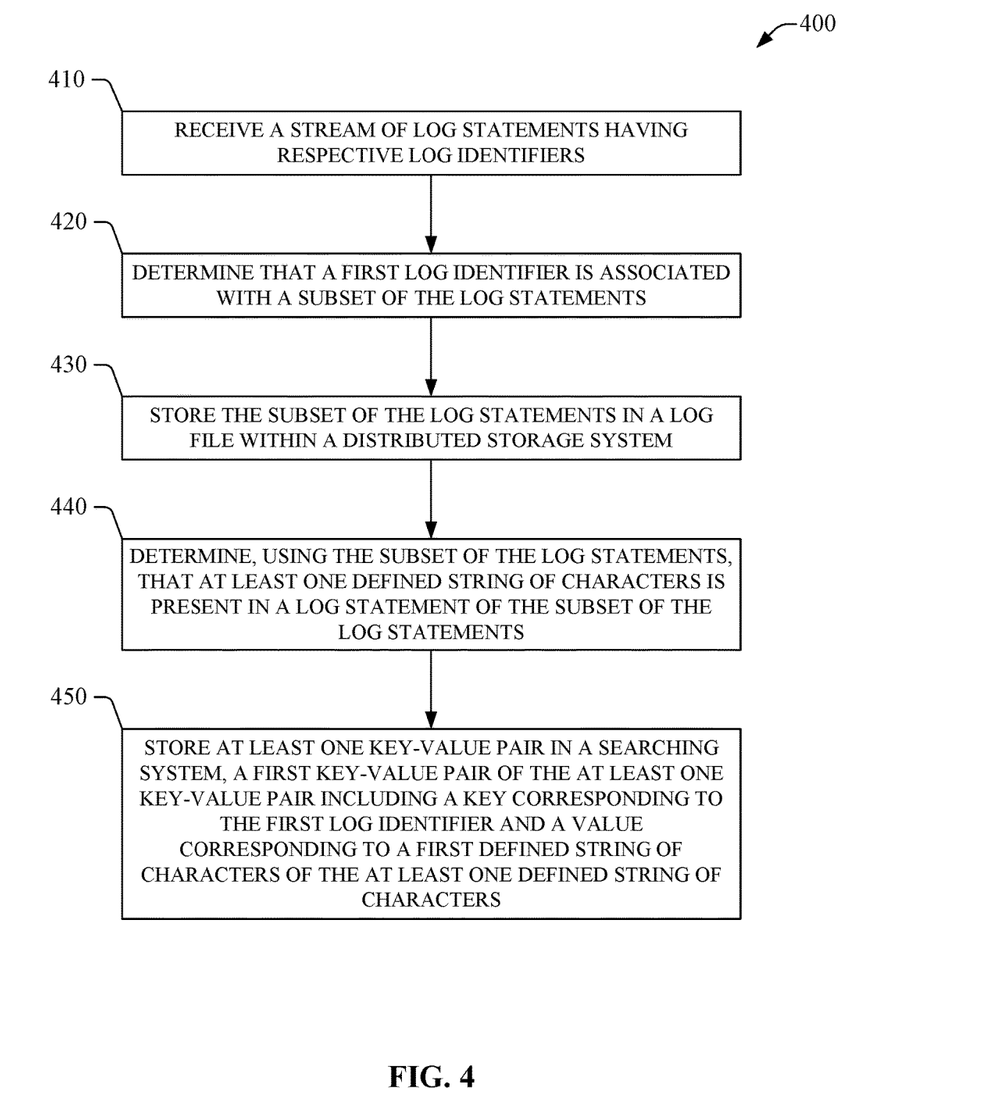
FIGS. 4-5 present examples of methods in accordance with one or more embodiments of the disclosure.
Figure 5:
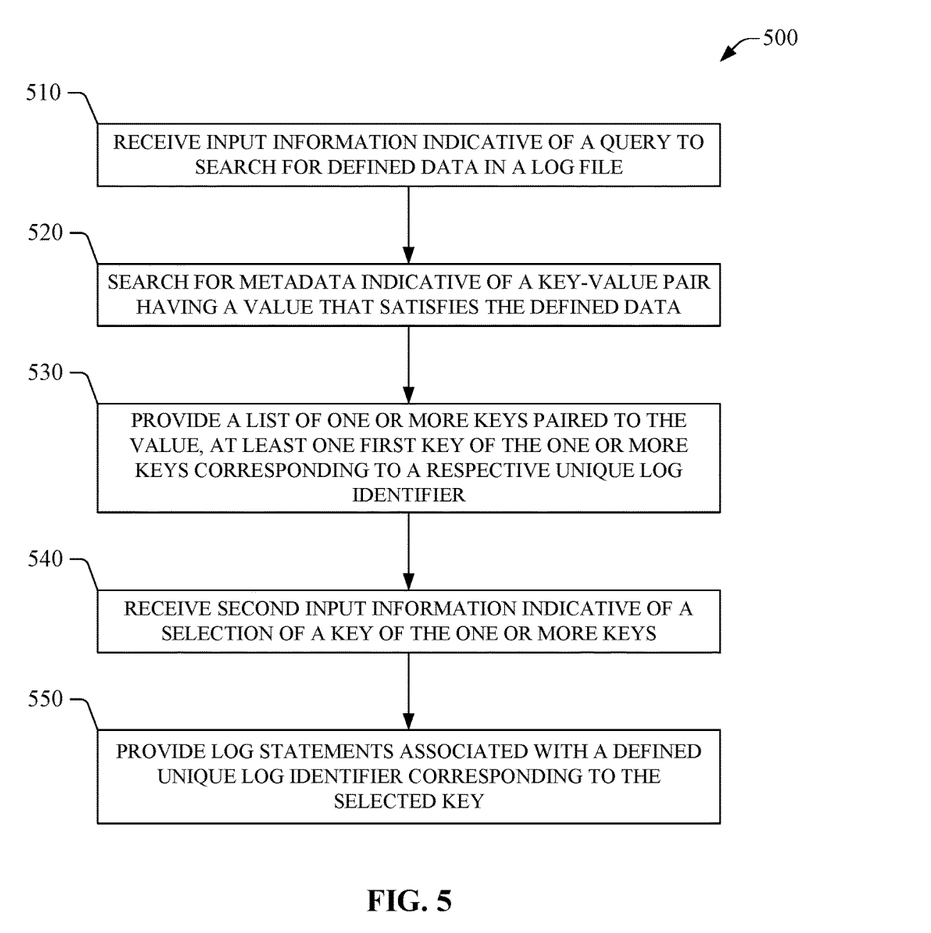

In view of the aspects of the disclosure described herein, example methods that can be implemented in accordance with the disclosure can be more readily appreciated with reference to the flowcharts in FIGS. 4-5. For purposes of simplicity of explanation, the example methods disclosed herein are presented and described as a series of blocks (with each block representing an action or an operation in a method, for example). However, it is to be understood and appreciated that the disclosed methods are not limited by the order of blocks and associated actions or operations, as some blocks may occur in different orders and/or concurrently with other blocks from that are shown and described herein. For example, the various methods or processes of the disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more functionalities and/or advantages described herein.

It is noted that the methods of the disclosure can be retained on an article of manufacture, or computer-readable medium, to permit or facilitate transporting and transferring such methods to a computing device (e.g., a desktop computer; a mobile computer, such as a tablet, or a smartphone; a mobile telephone; a blade computer; a programmable logic controller, and the like) for execution, and thus implementation, by a processor of the computing device or for storage in a memory device thereof or functionally coupled thereto. In one aspect, one or more processors, such as processor(s) that implement (e.g., link, compile, and/or execute) one or more of the disclosed methods, can be employed to execute code instructions retained in a memory, or any computer- or machine-readable medium, to implement the one or more methods. The code instructions can provide a computer-executable or machine-executable framework to implement the methods described herein.

FIG. 4 illustrates a flowchart of an example method 400 for configuring storage of log information according to one or more embodiments of the disclosure. In some embodiments, a computing system that has at least one processor and/or is functionally coupled to at least one processor can implement (e.g., link, compile, and/or execute) one or more blocks of the example method 400. In some scenarios, one or more blocks of the example method 400 can be implemented in a distributed fashion by two or more computing devices contained in the computing system. Each of the two or more computing devices can have at least one processor or can be functionally coupled to at least one processor, where such processor(s) can implement at least one of the one or more blocks. Regardless of the example method 400 being implemented by a distributed or non-distributed computing system, the at least one processor can be functionally coupled to at least one memory device or other types of computer-readable non-transitory storage media. While the example method 400 is disclosed with reference to log statements, the example method 400 is not limited in that respect and it can be implemented with reference to any discrete amounts of information, such as defined categories or the like.

At block 410, the computing system that implements the example method 400 can receive a stream of log statements having respective identifiers. As mentioned, each (or, in some embodiments at least one) of such identifiers can be embodied in or can include, for example, a unique numeric code, a unique alphanumeric code, a unique alphabetic code, or a unique code including special characters. At block 420, the computing system can determine that a first log identifier is associated with a subset of the log statements. To that end, in some implementations, a component of the computing system can identify the first log identifier in at least one of the log statements, where the at least of the log statements forms such a subset. The component can be embodied in or can constitute the storage configuration unit 140. At block 430, the computing system can store the subset of the log statements in a log file within a distributed storage system. In some implementations, that component that implements (e.g., executes) block 420 or another component of the computing system can execute a command, a code script, or another instruction in order to generate or otherwise create the log file within a file system or other types of logical and/or physical storage devices within the distributed storage system. In one aspect, the log file can be stored in a folder having a folder name including a portion of the log identifier or the log identifier in its entirety. The component that creates the log file also can create the folder. At block 440, the computing system can determine, using the subset of the log statements, that at least one defined string of characters is present in a log statement of the subset of the log statements. In one implementation, the storage configuration unit 140 can implement block 440. The defined string of characters can be indicative of or otherwise representative of a product name; a product type; a customer identifier; a user account identifier; an agent identifier of an agent (e.g., employee) of an entity that owns, leases, or otherwise administers that environment 100 or a portion thereof; or the like. As mentioned, the defined string of characters can be utilized as a searchable field when searching for a specific log statement in accordance with aspects described herein. In some implementations, determining that the at least one defined string of characters is present in the log statement of the subsets of the log statements can include determining that a search pattern indicative of the at least one defined string of characters is present in such a log statement. In some aspects, the search pattern can include natural language representative of at least one of a user account identifier, a product type, a product name, or a timestamp. In some embodiments, in order to determine such a search pattern is present in the log statement can include searching for the search pattern in the at least one of the logging information statement.

At block 450, the computing system can store at least one key-value pair in a searching system. As mentioned, in some embodiments, the searching system can provide a searching service and can be embodied in or can include the search engine unit 160, for example. In some aspects, a first key-value pair of the at least one key-value pair can include a key corresponding to the first log identifier of block 420 and a value corresponding to a first defined string of characters of the at least one defined string of characters of block 440.

In some embodiments, the example method 400 can include receiving, by the searching system a search query directed to a second defined string of characters. A client device, such a device 170, can send such a search query to the searching system. In addition or in other embodiments, the example method 400 can include generating, by the searching system, second statement identifiers using at least the search query, a first one of the second statement identifiers paired with a third value that satisfies the search query and a second one of the second statement identifiers paired with the third value. Further or in yet other embodiments, the searching system or a component therein can send a data structure indicative of the second statement identifiers to the client device.

In some embodiments, the example method can include receiving, from the client device, a request for at least a second one of the logging information statements, the request comprising one of the statement identifiers. In one example, the distributed storage system of block 430 can receive such a request. The example method 400 also can include receiving the at least second one of the logging information statements from the distributed storage system, and decrypting the at least second one of the logging information statements. In addition or in other embodiments—such as an embodiment in which the decryption is performed externally to the client device—the example method 400 can further include sending the decrypted at least second one of the logging information statements to the client device.

FIG. 5 illustrates a flowchart of an example method 500 for searching a log file according to one or more embodiments of the disclosure. In some embodiments, a computing system that has at least one processor and/or is functionally coupled to at least one processor can implement (e.g., compile, execute, compile and execute, etc.) one or more blocks of the example method 500. In some scenarios, one or more blocks of the example method 500 can be implemented in a distributed fashion by two or more computing devices contained in the computing system. Each of the two or more computing devices can have at least one processor or can be functionally coupled to at least one processor, where such processor(s) can implement at least one of the one or more blocks. Regardless of the example method 500 being implemented by a distributed or non-distributed computing system, the at least one processor can be functionally coupled to at least one memory device or other types of computer-readable non-transitory storage media.

At block 510, the computing system that implements the example method 500 can receive a query to search for defined data in a log file. In some embodiments, a component of the computing system (e.g., the search engine unit 160) can receive the query from a device (e.g., device 170) over a communication network or a communication channel thereof. As mentioned, the communication network can include a wireless network, a wireline network, or a combination thereof. At block 520, the computing system can search for key-value pairs each having a value that matches the defined data. The search can be implemented, in some embodiments, as a reverse index search of via a hash table, and the search can result in one or more keys respectively paired to the value, the key(s) corresponding to a respective unique log identifier. In some aspects, the component that receives the query (e.g., the search engine unit 160) can perform or otherwise implement the search for the key-value pairs. At block 530, the computing system can provide a list of the one or more keys corresponding to a respective unique log identifier. As mentioned, the disclosure is not limited in that respect, and other data structures indicative or otherwise representative of the one or more keys also can be provided. At block 540, the computing system can receive second input information indicative of a selection of a key of the one or more keys. To that end, in some implementations, the device can receive the list of the one or more keys, and can present selectable indicia indicative or otherwise representative of the one or more keys. In respect to a selection of the key, the device can send, over another communication network, the second input information indicative of the selection of the key to another component of the computing system (e.g., the repository 150 or a component thereof). At block 550, the computing system can provide log statements associated with a unique log identifier corresponding to the key selected at block 540. In some aspects, the component that receives the second input information (e.g., the repository 150) can provide (e.g., identify and/or send) such log statements. In some implementations, the log statements can be sent to the device of the second communication network, and the device can process at least a portion of the log statements in numerous ways. In one example, at least some of the log statements can be sorted according to a defined criterion (e.g., chronological order). In addition or in another example, at least some of the log statements can be decrypted prior to or upon being presented at a display device, for example, of the device.

Figure 6:
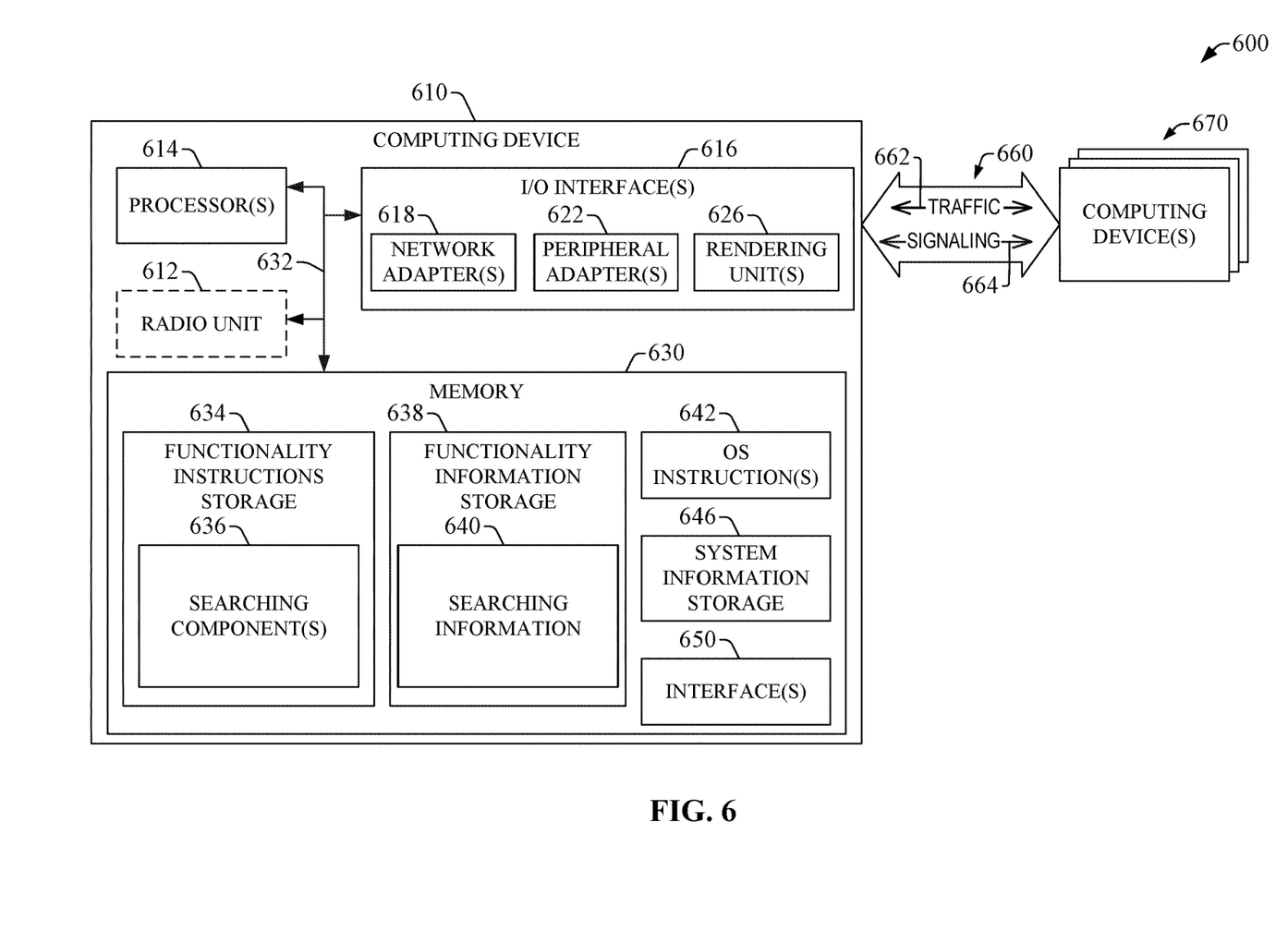
FIG. 6 presents an example of a computational environment for log searching in accordance with one or more embodiments of the disclosure.

FIG. 6 illustrates a block diagram of an example computational environment 600 for searching logging information in accordance with one or more aspects of the disclosure. The example computational environment 600 is merely illustrative and is not intended to suggest or otherwise convey any limitation as to the scope of use or functionality of the computational environment's architecture. In addition, the illustrative computational environment 600 depicted in FIG. 6 should not be interpreted as having any dependency or requirement relating to any one or combination of components illustrated in the example operational environments of the disclosure. The example computational environment 600 or portions thereof can embody or can include, for example, the computing environment 100. For example, one or more of the computing devices, and elements thereof, in the example computational environment 600 can embody or can constitute devices (or, in some embodiments, units or other functional elements) of the computing environment 100.

The computational environment 600 represents an example implementation of the various aspects or features of the disclosure in which the processing or execution of operations described in connection with the searching of logging information disclosed herein can be performed in response to execution of one or more software components at the computing device 610. It should be appreciated that the one or more software components can render the computing device 610, or any other computing device that contains such components, a particular machine for searching logging information, in accordance with aspects described herein, among other functional purposes. A software component can be embodied in or can comprise one or more computer-accessible instructions, e.g., computer-readable and/or computer-executable instructions. In one scenario, at least a portion of the computer-accessible instructions can embody and/or can be executed to perform at least a part of one or more of the example methods described herein, such as the example method 400 illustrated in FIG. 4 and/or the example method 500 illustrated in FIG. 5. For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 610 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 610 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or elements of the disclosure in connection with the searching of logging information described herein can comprise personal computers; server computers; laptop devices; handheld computing devices, such as mobile tablets; wearable computing devices; and multiprocessor systems. Additional examples can include programmable consumer electronics, network personal computers (PCs), minicomputers, mainframe computers, blade computers, programmable logic controllers, distributed computing environments that comprise any of the above systems or devices, and the like.

As illustrated, the computing device 610 can comprise one or more processors 614, one or more input/output (I/O) interfaces 616, a memory 630, and a bus architecture 632 (also termed bus 632) that functionally couples various functional elements of the computing device 610. In certain embodiments, the computing device 610 can include, optionally, a radio unit 612. The radio unit 612 can include one or more antennas and a communication processing unit that can permit wireless communication between the computing device 610 and another device, such as one of the computing device(s) 670. The bus 632 can include at least one of a system bus, a memory bus, an address bus, or a message bus, and can permit exchange of information (data, metadata, and/or signaling) between the processor(s) 614, the I/O interface(s) 616, and/or the memory 630, or respective functional elements therein. In certain scenarios, the bus 632 in conjunction with one or more internal programming interfaces 650 (also referred to as interface(s) 650) can permit such exchange of information. In scenarios in which processor(s) 614 include multiple processors, the computing device 610 can utilize parallel computing.

The I/O interface(s) 616 can permit communication of information between the computing device and an external device, such as another computing device, e.g., a network element or an end-user device. Such communication can include direct communication or indirect communication, such as exchange of information between the computing device 610 and the external device via a network or elements thereof. As illustrated, the I/O interface(s) 616 can comprise one or more of network adapter(s) 618, peripheral adapter(s) 622, and rendering unit(s) 626. Such adapter(s) can permit or facilitate connectivity between the external device and one or more of the processor(s) 614 or the memory 630. For example, the peripheral adapter(s) 622 can include a group of ports, which can include at least one of parallel ports, serial ports, Ethernet ports, V.35 ports, or X.21 ports. In certain embodiments, the parallel ports can comprise General Purpose Interface Bus (GPM), IEEE-1284, while the serial ports can include Recommended Standard (RS)-232, V.11, Universal Serial Bus (USB), FireWire or IEEE-1394.

In one aspect, at least one of the network adapter(s) 618 can functionally couple the computing device 610 to one or more computing devices 670 via one or more traffic and signaling links 660 (e.g., wireless link(s) and/or wireline link(s) and several network components) that can permit or facilitate exchange of traffic 662 and signaling 664 between the computing device 610 and the one or more computing devices 670. Such network coupling provided at least in part by the at least one of the network adapter(s) 618 can be implemented in a wired environment, a wireless environment, or both. The information that is communicated by the at least one of the network adapter(s) 618 can result from the implementation of one or more operations of a method in accordance with aspects of this disclosure. Such output can be any form of visual representation, including, but not limited to, textual, graphical, animation, audio, tactile, and the like. In certain scenarios, each (or, in some embodiments, at least one) of the computing device(s) 670 can have the same architecture as (or, in some embodiments, a similar architecture to) the computing device 610. In addition or in the alternative, the rendering unit(s) 626 can include functional elements (e.g., lights, such as light-emitting diodes; a display, such as a liquid crystal display (LCD), a plasma monitor, a light emitting diode (LED) monitor, or an electrochromic monitor; combinations thereof; or the like) that can permit control of the operation of the computing device 610, or can permit conveying or revealing the operational conditions of the computing device 610.

In one aspect, the bus 632 represents one or more of several possible types of bus structures, including a memory bus or a memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI) bus, a PCI-Express bus, a Personal Computer Memory Card International Association (PCMCIA) bus, a Universal Serial Bus (USB), and the like. The bus 632, and all buses described herein can be implemented over a wired or wireless network connection and each of the subsystems, including the processor(s) 614, the memory 630 and memory elements therein, and the I/O interface(s) 616 can be contained within one or more remote computing devices 670 at physically separate locations, connected through buses of this form, in effect implementing a fully distributed system. In certain embodiments, such a distributed system can implement the functionality described herein in a client-host or client-server configuration in which the searching component(s) 636 or the searching information 640, or both, can be distributed between the computing device 610 and at least one of the computing device(s) 670, and the computing device 610 and at least one of the computing device(s) 670 can execute such components and/or leverage such information in order to provide or otherwise facilitate the functionalities described herein in connection with the searching of logging information. In such embodiments, for example, a combination of the computing device 610 and at least one of the computing device(s) 670 can embody or can constitute respective devices (or, in some implementations, components or other functional elements) of the computing environment 100. As such, in some example implementations, a computing device of the computing device(s) 670 can embody or can include a semi-connected device as described herein.

The computing device 610 can comprise a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 610, and can comprise, for example, both volatile and non-volatile media, and removable and/or non-removable media. In one aspect, the memory 630 can comprise computer-readable media in the form of volatile memory, such as random access memory (RAM), and/or non-volatile memory, such as read-only memory (ROM).

The memory 630 can comprise functionality instructions storage 634 and functionality information storage 638. The functionality instructions storage 634 can comprise computer-accessible instructions that, in response to execution (by at least one of the processor(s) 614), can implement one or more of the functionalities of the disclosure. The computer-accessible instructions can embody or can comprise one or more software components illustrated as searching component(s) 636. In one scenario, execution of at least one component of the searching component(s) 636 can implement one or more of the methods described herein, such as example method 900 and/or example method 1000. For instance, such execution can direct or otherwise cause a processor (e.g., one of the processor(s) 614) that executes the at least one component to carry out a disclosed example method. It should be appreciated that, in one aspect, a processor of the processor(s) 614 that executes at least one of the searching component(s) 636 can retrieve information from or retain information in one or more memory elements 640 in the functionality information storage 638 in order to operate in accordance with the functionality programmed or otherwise configured by the searching component(s) 636. The one or more memory elements 640 may be referred to as searching information 640. Such information can include at least one of code instructions, information structures, or the like. For instance, at least a portion of such information structures can be indicative of directories; log files; log metadata; and/or one or more criteria to order a group of logging information statements.

In certain embodiments, one or more of the searching component(s) 636 can embody or can constitute at least one of the statement configuration unit 214 and/or the metadata configuration unit 218. In addition, one or more second ones of the searching component(s) 636 can embody or can constitute the utility unit 318. In other embodiments, one or more of the searching component(s) 636 in combination with at least one of the processor(s) 614 can embody or can constitute at least one of the statement configuration unit 214 and/or the metadata configuration unit 218, and can provide the functionality of such components in accordance with aspects of this disclosure.

At least a first one of the one or more interfaces 650 (e.g., application programming interface(s)) can permit or facilitate communication of information between two or more components within the functionality instructions storage 634. The information that is communicated by the at least one interface can result from implementation of one or more operations in a method of the disclosure. In certain embodiments, one or more of the functionality instructions storage 634 and the functionality information storage 638 can be embodied in or can comprise removable/non-removable, and/or volatile/non-volatile computer storage media. In addition, at least a second one of the interface(s) 650 can embody or can constitute the input interface 314. Further or in some embodiments, a combination of the at least second one of the interface(s) 650 and other functional elements of the computing device 610 can embody or can constitute the input interface 314.

At least a portion of at least one of the searching component(s) 636 or the searching information 640 (which also may be referred to as searching configuration information) can program or otherwise configure one or more of the processors 614 to operate at least in accordance with the functionality described herein. One or more of the processor(s) 614 can execute at least one of the searching component(s) 636 and leverage at least a portion of the information in the functionality information storage 638 in order to provide or otherwise facilitate the searching of logging information in accordance with one or more aspects described herein.

It should be appreciated that, in certain scenarios, the functionality instruction(s) storage 634 can embody or can comprise a computer-readable non-transitory storage medium having computer-accessible instructions that, in response to execution, cause at least one processor (e.g., one or more of the processor(s) 614) to perform a group of operations comprising the operations or blocks described in connection with the disclosed methods.

In addition, the memory 630 can comprise computer-accessible instructions and information (e.g., data, metadata, and/or programming code instructions) that permit or facilitate the operation and/or administration (e.g., upgrades, software installation, any other configuration, or the like) of the computing device 610. Accordingly, as illustrated, the memory 630 can comprise a memory element 642 (labeled operating system (OS) instruction(s) 642) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architectural complexity of the computing device 610 can dictate a suitable OS. The memory 630 also comprises a system information storage 646 having data, metadata, and/or programming code that permits or facilitates the operation and/or administration of the computing device 610. Elements of the OS instruction(s) 642 and the system information storage 646 can be accessible or can be operated on by at least one of the processor(s) 614.

It should be recognized that while the functionality instructions storage 634 and other executable program components, such as the OS instruction(s) 642, are illustrated herein as discrete blocks, such software components can reside at various times in different memory components of the computing device 610, and can be executed by at least one of the processor(s) 614. In certain scenarios, an implementation of the searching component(s) 636 can be retained on or transmitted across some form of computer-readable media.

The computing device 610 and/or one of the computing device(s) 670 can include a power supply (not shown), which can power up components or functional elements within such devices. The power supply can be a rechargeable power supply, e.g., a rechargeable battery, and it can include one or more transformers to achieve a power level suitable for the operation of the computing device 610 and/or one of the computing device(s) 670, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 618) to connect operationally to the conventional power grid. In another aspect, the power supply can include an energy conversion component, such as a solar panel, to provide additional or alternative power resources or autonomy for the computing device 610 and/or one of the computing device(s) 670.

The computing device 610 can operate in a networked environment by utilizing connections to one or more remote computing devices 670. As an illustration, a remote computing device can be a personal computer, a portable computer, a server, a router, a network computer, a peer device or other common network node, and so on. As described herein, connections (physical and/or logical) between the computing device 610 and a computing device of the one or more remote computing devices 670 can be made via one or more traffic and signaling links 660, which can include wired link(s) and/or wireless link(s) and several network elements (such as routers or switches, concentrators, servers, and the like) that form a PAN, a LAN, a MAN, a WAN, and/or other networks (wireless or wired) having different footprints. Such networking environments can be configured in dwellings, offices, enterprise-wide computer networks, intranets, local area networks, and wide area networks.

In one or more embodiments, one or more of the disclosed methods can be practiced in distributed computing environments, such as grid-based environments, where tasks can be performed by remote computing devices (computing device(s) 1170) that are functionally coupled (e.g., communicatively linked or otherwise coupled) through a network having traffic and signaling links and related network elements. In a distributed computing environment, in one aspect, one or more software components (such as program modules) can be located in both a local computing device 1110 and at least one remote computing device.

The disclosed operational environments (e.g., system(s), device(s), etc.) and methods may take the form of an entirely hardware embodiment, an entirely software embodiment, or an embodiment combining hardware and software features. Furthermore, the methods and systems may take the form of a computer program product on a computer-readable non-transitory storage medium having computer-accessible instructions (e.g., computer-readable and/or computer-executable instructions), such as computer software, embodied in the computer-readable non-transitory storage medium. Any suitable computer non-transitory storage medium may be utilized to form the computer program product.

Embodiments of the operational environments and methods are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "system," "architecture," "platform," "interface," "unit," "module," "engine," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or other programming components. The terms "component," "environment," "system," "architecture," "platform," "interface," "unit," "module," "engine" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance performance of user equipment.

In addition, in the present specification and annexed drawings, terms such as "store," "storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can comprise hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of operational environments described herein are intended to comprise one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques for searching of logging information generated in response to execution in parallel of a software application across multiple computing devices. It is, of course, not possible to describe every conceivable combination of elements and/or methods for purposes of describing the various features of the disclosure, but it can be recognize that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:
1. A method, comprising:
receiving, by a computing system comprising one or more host computers, a stream of log statements having respective log identifiers over a communication network from remote host computers, wherein a first log identifier of the respective log identifiers uniquely identifies a computing session that generates a first log statement of the stream of log statements;
determining, by the computing system, that the first log identifier is associated with each statement of a subset of the log statements;
creating, by the computing system, in a distributed storage sub-system of the computing system, a directory having a name corresponding to the first log identifier;
creating, by the computing system, within the directory, a log file including the subset of the log statements;
determining, by the computing system, using the subset of the log statements, that a defined sequence of characters is present in a second log statement of the subset of the log statements, the defined sequence of characters including natural language representative of at least one of a user account identifier, a product type, a product name, or a timestamp;
generating, by the computing system, a value corresponding to the defined sequence of characters; and
creating, by the computing system, in a searching sub-system of the computing system, a key-value pair comprising the value and a key corresponding to the first log identifier.

2. The method of claim 1, further comprising receiving, by the searching sub-system, a search query over a second communication network from a client device;
generating second log identifiers using at least the search query, a first one of the second log identifiers paired with a second value that satisfies the search query and a second one of the second log identifiers paired with the second value; and
sending, by the searching sub-system, a list of the second log identifiers over the second communication network to the client device.

3. The method of claim 2, further comprising receiving, by the computing system, a request for a second subset of the log statements over a third communication network from the client device, the request comprising one of the log identifiers in the list;
receiving, by the computing system, the second subset of the log statements from the distributed storage sub-system;
ordering, by the computing system, the second subset of the log statements chronologically; and
sending, by the computing system, the ordered second subset of the log statements over the second communication network to the client device.

4. The method of claim 1, wherein the determining comprises searching for a regular expression in the second log statement, the regular expression comprising the defined sequence of characters; and
determining that the regular expression is present in the second log statement.

5. The method of claim 4, wherein the searching for the regular expression comprises applying a grep command to the log file, the grep command including the defined sequence of characters as a search pattern.

6. A system, comprising:
at least one memory device having computer-executable instructions; and at least one processor coupled to the at least one memory device and configured, by the computer-executable instructions, to:
- receive logging information statements having respective statement identifiers, wherein a first statement identifier of the respective statement identifiers identifies a computing session associated with a first logging information statement of the logging information statements;
- determine that the first statement identifier is included in at least one of the logging information statements;
- store a file within a distributed storage sub-system of the system, the file including the at least one of the logging information statements;
- determine that a defined string of characters is present in the at least one of the logging information statements;
- generate a first value corresponding to the defined string of characters; and
- store a key-value pair in a second sub-system of the system, the key-value pair comprising the first value corresponding to the defined string of characters, and a second value corresponding to the first statement identifier.

7. The system of claim 6, wherein to receive the logging information statements having respective statement identifiers, the at least one processor is further configured, by the computer-executable instructions, to receive one or more of an ordered series of second logging information statements from a host computer, or a batch of third logging information statements during a defined period from the host computer.

8. The system of claim 6, wherein the at least one processor is further configured, by the computer-executable instructions to:
- receive, from a client device, a search query directed to a second defined string of characters; and
- generate second statement identifiers using at least the search query, a first one of the second statement identifiers paired with a third value that satisfies the search query and a second one of the second statement identifiers paired with the third value.

9. The system of claim 8, wherein the at least one processor is further configured, by the computer-executable instructions, to send a data structure indicative of the second statement identifiers to the client device.

10. The system of claim 8, wherein the at least one processor is further configured, by the computer-executable instructions, to:
- receive a request for at least a second one of the logging information statements from the client device, the request comprising one of the statement identifiers;
- receive the at least second one of the logging information statements from the distributed storage sub-system; and
- decrypt the at least second one of the logging information statements.

11. The system of claim 10, wherein the at least one processor is further configured, by the computer-executable instructions, to send the decrypted at least second one of the logging information statements.

12. The system of claim 7, wherein to determine that the defined string of characters is present in the at least one of the logging information statements, the at least one processor is further configured, by the computer-executable instructions, to:
- determine that a search pattern indicative of the defined string of characters is present in the at least one of the logging information statement.

13. The system of claim 12, wherein the search pattern comprises natural language representative of at least one of a user account identifier, a product type, a product name, or a timestamp, and
- wherein to determine that the search pattern is present in the at least one of the logging information statement, the at least one processor is further configured, by the computer-executable instructions, to search for the search pattern in the at least one of the logging information statements.

14. A method, comprising:
- receiving, by a computing system comprising one or more host computers, logging information statements having respective statement identifiers, wherein a first statement identifier of the respective statement identifiers identifies a computing session associated with a first logging information statement of the logging information statements;
- determining, by the computing system, that the first statement identifier is included in at least a first one of the logging information statements;
- storing, by the computing system, a file within a first sub-system of the computing system, the file including the at least the first one of the logging information statements;
- determining, by the computing system, that a defined string of characters is present in the at least the first one of the logging information statements;
- generating a first value corresponding to the defined string of characters; and
- storing, by the computing system, a key-value pair in a second sub-system of the computing system, the key-value pair comprising the first value corresponding to the defined string of characters, and a second value corresponding to the first statement identifier.

15. The method of claim 14, further comprising receiving, by the second sub-system, from a client device, a search query directed to a second defined string of characters; and
- generating, by the second sub-system, second statement identifiers using at least the search query, a first one of the second statement identifiers paired with a third value that satisfies the search query and a second one of the second statement identifiers paired with the third value.

16. The method of claim 15, further comprising sending a data structure indicative of the second statement identifiers to the client device.

17. The method of claim 15, further comprising receiving, from the client device, a request for at least a second one of the logging information statements, the request comprising one of the statement identifiers;
- receiving the at least second one of the logging information statements from the first sub-system; and
- decrypting the at least second one of the logging information statements.

18. The method of claim 17, further comprising sending the decrypted at least second one of the logging information statements to the client device.

19. The method of claim 14, wherein determining that the defined string of characters is present in the at least one of the logging information statements comprises determining that a search pattern indicative of the defined string of characters is present in the at least the first one of the logging information statements.

20. The method of claim 19, wherein the search pattern comprises natural language representative of at least one of a user account identifier, a product type, a product name, or a timestamp, and wherein the method further comprises searching for the search pattern in the at least one of the logging information statement.

\* \* \* \* \*